US011625612B2

(12) United States Patent
Vahdat et al.

(10) Patent No.: US 11,625,612 B2
(45) Date of Patent: Apr. 11, 2023

(54) SYSTEMS AND METHODS FOR DOMAIN ADAPTATION

(71) Applicant: D-WAVE SYSTEMS INC., Burnaby (CA)

(72) Inventors: Arash Vahdat, Coquitlam (CA); Mani Ranjbar, Port Coquitlam (CA); Mehran Khodabandeh, Coquitlam (CA); William G. Macready, West Vancouver (CA); Zhengbing Bian, Burnaby (CA)

(73) Assignee: D-WAVE SYSTEMS INC., Burnaby (CA)

( * ) Notice: Subject to any disclaimer, the term of this patent is extended or adjusted under 35 U.S.C. 154(b) by 505 days.

(21) Appl. No.: 16/779,035

(22) Filed: Jan. 31, 2020

(65) Prior Publication Data
US 2020/0257984 A1 Aug. 13, 2020

Related U.S. Application Data

(60) Provisional application No. 62/804,615, filed on Feb. 12, 2019.

(51) Int. Cl.
*G06N 3/08* (2006.01)
*G06N 5/02* (2006.01)
(Continued)

(52) U.S. Cl.
CPC ............. *G06N 3/088* (2013.01); *G06N 5/02* (2013.01); *G06N 5/022* (2013.01); *G06N 5/04* (2013.01); *G06N 5/045* (2013.01)

(58) Field of Classification Search
CPC .......... G06N 3/088; G06N 5/02; G06N 5/022; G06N 5/04; G06N 5/045; G06N 3/08; G06N 10/00; G06N 3/0454
See application file for complete search history.

(56) References Cited

U.S. PATENT DOCUMENTS 5,249,122 A 9/1993 Stritzke
6,424,933 B1 * 7/2002 Agrawala ............. G06T 11/206
703/2

(Continued)

FOREIGN PATENT DOCUMENTS

CN 101473346 A 7/2009
CN 101657827 A 2/2010
(Continued)

OTHER PUBLICATIONS

Awasthi et al., "Efficient Learning of Linear Separators under Bounded Noise" Mar. 12, 2015, arXiv: 1503.03594v1, pp. 1-23. (Year: 2015).

(Continued)

*Primary Examiner* — Kakali Chaki
*Assistant Examiner* — Ababacar Seck
(74) *Attorney, Agent, or Firm* — Cozen O'Connor

(57) ABSTRACT

The domain adaptation problem is addressed by using the predictions of a trained model over both source and target domain to retain the model with the assistance of an auxiliary model and a modified objective function. Inaccuracy in the model's predictions in the target domain is treated as noise and is reduced by using a robust learning framework during retraining, enabling unsupervised training in the target domain. Applications include object detection models, where noise in retraining is reduced by explicitly representing label noise and geometry noise in the objective function and using the ancillary model to inject information about label noise.

10 Claims, 3 Drawing Sheets

(51) Int. Cl.
  *G06N 5/04* (2006.01)
  *G06N 3/088* (2023.01)
  *G06N 5/022* (2023.01)
  *G06N 5/045* (2023.01)

(56) References Cited

U.S. PATENT DOCUMENTS

| | | |
|---|---|---|
| 6,671,661 B1 | 12/2003 | Bishop |
| 7,135,701 B2 | 11/2006 | Amin et al. |
| 7,418,283 B2 | 8/2008 | Amin |
| 7,493,252 B1 | 2/2009 | Nagano et al. |
| 7,533,068 B2 | 5/2009 | Maassen et al. |
| 7,876,248 B2 | 1/2011 | Berkley et al. |
| 8,008,942 B2 | 8/2011 | Van et al. |
| 8,035,540 B2 | 10/2011 | Berkley et al. |
| 8,073,808 B2 | 12/2011 | Rose |
| 8,190,548 B2 | 5/2012 | Choi |
| 8,195,596 B2 | 6/2012 | Rose et al. |
| 8,244,650 B2 | 8/2012 | Rose |
| 8,340,439 B2 | 12/2012 | Mitarai et al. |
| 8,421,053 B2 | 4/2013 | Bunyk et al. |
| 8,543,828 B2 | 10/2013 | Longmire |
| 8,560,282 B2 | 10/2013 | Love et al. |
| 8,863,044 B1 | 10/2014 | Casati et al. |
| 9,378,733 B1 | 6/2016 | Vanhoucke et al. |
| 9,495,644 B2 | 11/2016 | Chudak et al. |
| 9,727,824 B2 | 8/2017 | Rose et al. |
| 9,881,256 B2 | 1/2018 | Hamze et al. |
| 10,296,846 B2 | 5/2019 | Csurka et al. |
| 10,318,881 B2 | 6/2019 | Rose et al. |
| 10,339,466 B1 | 7/2019 | Ding et al. |
| 10,817,796 B2 | 10/2020 | Macready et al. |
| 11,157,817 B2 | 10/2021 | Rolfe |
| 2002/0010691 A1 | 1/2002 | Chen |
| 2002/0077756 A1 | 6/2002 | Arouh et al. |
| 2003/0030575 A1 | 2/2003 | Frachtenberg et al. |
| 2005/0119829 A1 | 6/2005 | Bishop et al. |
| 2006/0041421 A1 | 2/2006 | Ta et al. |
| 2006/0047477 A1 | 3/2006 | Bachrach |
| 2006/0074870 A1 | 4/2006 | Brill et al. |
| 2006/0115145 A1 | 6/2006 | Bishop et al. |
| 2007/0011629 A1 | 1/2007 | Shacham et al. |
| 2007/0162406 A1 | 7/2007 | Lanckriet |
| 2008/0069438 A1 | 3/2008 | Winn et al. |
| 2008/0103996 A1 | 5/2008 | Forman et al. |
| 2008/0132281 A1 | 6/2008 | Kim et al. |
| 2008/0176750 A1 | 7/2008 | Rose et al. |
| 2008/0215850 A1 | 9/2008 | Berkley et al. |
| 2008/0312663 A1 | 12/2008 | Haimerl et al. |
| 2008/0313430 A1 | 12/2008 | Bunyk |
| 2009/0077001 A1 | 3/2009 | Macready et al. |
| 2009/0121215 A1 | 5/2009 | Choi |
| 2009/0171956 A1 | 7/2009 | Gupta et al. |
| 2009/0254505 A1 | 10/2009 | Davis et al. |
| 2009/0278981 A1 | 11/2009 | Bruna et al. |
| 2009/0322871 A1 | 12/2009 | Ji et al. |
| 2010/0010657 A1 | 1/2010 | Do et al. |
| 2010/0185422 A1 | 7/2010 | Hoversten |
| 2010/0228694 A1 | 9/2010 | Le et al. |
| 2010/0332423 A1 | 12/2010 | Kapoor et al. |
| 2011/0022369 A1 | 1/2011 | Carroll et al. |
| 2011/0022820 A1 | 1/2011 | Bunyk et al. |
| 2011/0044524 A1 | 2/2011 | Wang et al. |
| 2011/0047201 A1 | 2/2011 | Macready et al. |
| 2011/0142335 A1 | 6/2011 | Ghanem et al. |
| 2011/0231462 A1 | 9/2011 | Macready et al. |
| 2011/0238378 A1 | 9/2011 | Allen et al. |
| 2011/0295845 A1 | 12/2011 | Gao et al. |
| 2012/0084235 A1 | 4/2012 | Suzuki et al. |
| 2012/0124432 A1 | 5/2012 | Pesetski et al. |
| 2012/0149581 A1 | 6/2012 | Fang |
| 2012/0215821 A1 | 8/2012 | Macready et al. |
| 2012/0254586 A1 | 10/2012 | Amin et al. |
| 2013/0071837 A1 | 3/2013 | Winters-Hilt et al. |
| 2013/0097103 A1 | 4/2013 | Chari et al. |
| 2013/0236090 A1 | 9/2013 | Porikli et al. |
| 2013/0245429 A1 | 9/2013 | Zhang et al. |
| 2014/0025606 A1 | 1/2014 | Macready |
| 2014/0040176 A1 | 2/2014 | Balakrishnan et al. |
| 2014/0152849 A1 | 6/2014 | Bala et al. |
| 2014/0187427 A1 | 7/2014 | Macready et al. |
| 2014/0200824 A1 | 7/2014 | Pancoska |
| 2014/0201208 A1 | 7/2014 | Satish et al. |
| 2014/0214835 A1 | 7/2014 | Oehrle et al. |
| 2014/0214836 A1 | 7/2014 | Stivoric et al. |
| 2014/0279727 A1 | 9/2014 | Baraniuk et al. |
| 2014/0297235 A1 | 10/2014 | Arora et al. |
| 2015/0006443 A1 | 1/2015 | Rose et al. |
| 2015/0161524 A1 | 6/2015 | Hamze |
| 2015/0205759 A1* | 7/2015 | Israel ............ G06F 17/11 703/2 |
| 2015/0242463 A1* | 8/2015 | Lin ............... G06K 9/6228 707/769 |
| 2015/0248586 A1* | 9/2015 | Gaidon .......... G06K 9/6267 382/103 |
| 2015/0269124 A1 | 9/2015 | Hamze et al. |
| 2015/0317558 A1 | 11/2015 | Adachi et al. |
| 2016/0019459 A1 | 1/2016 | Audhkhasi et al. |
| 2016/0042294 A1 | 2/2016 | Macready et al. |
| 2016/0078359 A1* | 3/2016 | Csurka .......... G06K 9/6215 706/12 |
| 2016/0078600 A1 | 3/2016 | Perez Pellitero et al. |
| 2016/0110657 A1 | 4/2016 | Gibiansky et al. |
| 2016/0174902 A1 | 6/2016 | Georgescu et al. |
| 2016/0180746 A1* | 6/2016 | Coombes ........ G06T 11/20 434/150 |
| 2016/0191627 A1 | 6/2016 | Huang et al. |
| 2016/0253597 A1* | 9/2016 | Bhatt ............ G06N 20/00 706/12 |
| 2016/0307305 A1 | 10/2016 | Madabhushi et al. |
| 2016/0328253 A1 | 11/2016 | Majumdar |
| 2017/0132509 A1 | 5/2017 | Li et al. |
| 2017/0147944 A1* | 5/2017 | Csurka .......... G06N 3/02 |
| 2017/0161633 A1* | 6/2017 | Clinchant ...... G06N 5/02 |
| 2017/0255871 A1 | 9/2017 | Macready et al. |
| 2017/0300817 A1 | 10/2017 | King et al. |
| 2018/0018584 A1 | 1/2018 | Nock et al. |
| 2018/0025291 A1 | 1/2018 | Dey et al. |
| 2018/0082172 A1 | 3/2018 | Patel et al. |
| 2018/0101784 A1 | 4/2018 | Rolfe et al. |
| 2018/0137422 A1 | 5/2018 | Wiebe et al. |
| 2018/0150728 A1 | 5/2018 | Vahdat |
| 2018/0157923 A1 | 6/2018 | El Kaliouby et al. |
| 2018/0165554 A1 | 6/2018 | Zhang et al. |
| 2018/0165601 A1 | 6/2018 | Wiebe et al. |
| 2018/0232649 A1 | 8/2018 | Wiebe et al. |
| 2018/0277246 A1 | 9/2018 | Zhong et al. |
| 2019/0005402 A1 | 1/2019 | Mohseni et al. |
| 2019/0018933 A1 | 1/2019 | Oono et al. |
| 2019/0030078 A1 | 1/2019 | Aliper et al. |
| 2019/0050534 A1 | 2/2019 | Apte et al. |
| 2019/0108912 A1 | 4/2019 | Spurlock et al. |
| 2019/0122404 A1* | 4/2019 | Freeman ........ G06V 40/171 |
| 2019/0180147 A1 | 6/2019 | Zhang et al. |
| 2019/0258907 A1 | 8/2019 | Rezende et al. |
| 2019/0258952 A1 | 8/2019 | Denchev |
| 2020/0167691 A1* | 5/2020 | Golovin ......... G06N 3/08 |
| 2020/0226197 A1 | 7/2020 | Woerner et al. |
| 2020/0234172 A1 | 7/2020 | King et al. |
| 2020/0311589 A1 | 10/2020 | Ollitrault et al. |
| 2020/0410384 A1 | 12/2020 | Aspuru-Guzik et al. |
| 2021/0279631 A1 | 9/2021 | Pichler et al. |
| 2022/0101170 A1 | 3/2022 | Denchev |

FOREIGN PATENT DOCUMENTS

| | | |
|---|---|---|
| CN | 102364497 A | 2/2012 |
| CN | 102651073 A | 8/2012 |
| CN | 102831402 A | 12/2012 |
| CN | 102324047 B | 6/2013 |
| CN | 102364497 B | 6/2013 |
| CN | 104050509 A | 9/2014 |
| CN | 102037475 B | 5/2015 |

(56) References Cited

FOREIGN PATENT DOCUMENTS

| | | | | | |
|---|---|---|---|---|---|
| CN | 104766167 | A | 7/2015 | | |
| CN | 104919476 | A | 9/2015 | | |
| CN | 105531725 | A | 4/2016 | | |
| CN | 106569601 | A | 4/2017 | | |
| CN | 112771549 | A | 5/2021 | | |
| JP | 2011008631 | A | 1/2011 | | |
| KR | 20130010181 | A | 1/2013 | | |
| WO | 2009120638 | A2 | 10/2009 | | |
| WO | 2010071997 | A1 | 7/2010 | | |
| WO | 2015193531 | A1 | 12/2015 | | |
| WO | 2016029172 | A1 | 2/2016 | | |
| WO | WO-2016037300 | A1 | * | 3/2016 | ........... G06K 9/6274 |
| WO | 2016089711 | A1 | 6/2016 | | |
| WO | 2016210018 | A1 | 12/2016 | | |
| WO | 2017031356 | A1 | 2/2017 | | |
| WO | 2017031357 | A1 | 2/2017 | | |
| WO | 2017066695 | A1 | 4/2017 | | |
| WO | 2017124299 | A1 | 7/2017 | | |
| WO | 2017132545 | A1 | 8/2017 | | |
| WO | 2019118644 | A1 | 6/2019 | | |
| WO | WO-2020163455 | A1 | * | 8/2020 | ........... G06K 9/0063 |

OTHER PUBLICATIONS

Awasthi et al., "Learning and 1-bit Compressed Sensing under Asymmetric Noise" Jun. 6, 2016, JMLR, pp. 1-41. (Year 2016).
Bach et al., "On the Equivalence between Herding and Conditional Gradient Algorithms," Proceedings of the 29th International Conference on Machine Learning, 2012, 8 pages.
Bach, F. et al., "Optimization with Sparsity-Inducing Penalties," arXiv:1108.0775v2 [cs.LG], Nov. 22, 2011, 116 pages.
Benedetti et al., "Quantum-assisted learning of graphical models with arbitrary pairwise connectivity" Sep. 8, 2016, arXiv: 1609.02542v1, pp. 1-13. (Year: 2016).
Berkley, A.J. et al., "Tunneling Spectroscopy Using a Probe Qubit," arXiv:1210.6310v2 [cond-mat.supr-con], Jan. 3, 2013, 5 pages.
Blanchard et al., "Classification with Asymmetric Label Noise: Consistency and Maximal Denoising" Aug. 5, 2016, arXiv:1303.1208v3, pp. 1-47. (Year: 2016).
Bornschein et al., "Bidirectional Helmholtz Machines" May 25, 2016, arXiv: 1506.03877v5. (Year: 2016).
Brakel, P., Dieleman, S., & Schrauwen. "Training restricted Boltzmann machines with multi-tempering: Harnessing parallelization", 2012.
Chen et al., "Herding as a Learning System with Edge-of-Chaos Dynamics," arXiv:1602.030142V2 [stat.ML], Mar. 1, 2016, 48 pages.
Chen et al., "Parametric Herding," Proceedings of the 13th International Conference on Artificial Intelligence and Statistics (AISTATS), 2010, pp. 97-104.
Chinese Office Action for Application No. CN 2016800606343, dated May 8, 2021, 21 pages (with English translation).
Courville, A. et al., "A Spike and Slab Restricted Boltzmann Machine," Proceedings of the 14th International Conference on Artificial Intelligence and Statistics (AISTATS), 2011, 9 pages.
Deng, J. et al., "ImageNet: A Large-Scale Hierarchical Image Database," Proceedings / CVPR, IEEE Computer Society Conference on Computer Vision and Pattern Recognition, 2009, 8 pages.
Desjardins, G., Courville, A., Bengio, Y., Vincent, P., & Delalleau, O. "Parallel tempering for training of restricted Boltzmann machines", 2010.
Dumoulin, V. et al., "On the Challenges of Physical Implementations of RBMs," Proceedings of the 28th AAAI Conference on Artificial Intelligence, vol. 2, Jul. 27, 2014, 7 pages.
Elkan, C., "Learning Classifiers from Only Positive and Unlabeled Data," KDD08: The 14th ACM SIGKDD International Conference on Knowledge Discovery and Data Mining Las Vegas Nevada USA Aug. 24-27, 2008, 8 pages.
Extended European Search Report for EP Application No. 16837862.8,dated Apr. 3, 2019, 12 pages.
Fergus, R. et al., "Semi-Supervised Learning in Gigantic Image Collections," Advances in Neural Information Processing Systems, vol. 22, 2009, 8 pages.
First Office Action dated Nov. 29, 2021 in CN App No. 2016800731803. (English Translation).
First Office Action issued in Chinese No. 2018101287473 with English translation, dated Jul. 12, 2021, 16 pages.
Freidman, et al., "Learning Bayesian Networks from Data", Internet Movie Database, http://www.imdb.com, 19 pages.
Freund, Y. et al., "Large Margin Classification Using the Perceptron Algorithm," Machine Learning 37(3), 1999, 19 pages.
Fung, G. et al., "Parameter Free Bursty Events Detection in Text Streams," Proceedings of the 31st VLDB Conference, Trondheim, Norway, 2005, 12 pages.
Geordie, "First Ever DBM Trained Using a Quantum Computer," URL:https://dwave.wordpress.com/2014/01/06 /first-ever-dbm-trained-using-a-quantum-computer/, Jan. 6, 2014, 8 pages.
Geordie, "Training DBMs with Physical neural nets" In Hack The Multiverse, Jan. 24, 2014, pp. 2-5.
Grassberger, "Entropy Estimates from Insufficient Samplings," arXiv:physics/0307138v2 [physics.data-an], Jan. 4, 2008, 5 pages.
Gómez-Bombarelli et al., "Automatic Chemical Design Using a Data-Driven Continuous Representation of Molecules," arXiv:1610.02415v3: Dec. 2017. (26 pages).
Goodfellow et al., "Generative Adversarial Nets", arXiv:1406.2661v1 [stat.ML], 9 pages, Jun. 10, 2014.
Amin , et al., "Quatum Boltzmann Machine". arXiv:1601.02036v1, Jan. 8, 2016.
Anonymous , "A Robust Learning Approach to Domain Adaptive Object Detection". CVPR, 2019.
Azadi , et al., "Auxiliary Image Regulation for Deep CNNs with Noisy Labels". arXiv:1511.07069v2 (2016).
B. Sallans and G.E. Hitton , "Reinforcement Learning with Factored States and Actions". JMLR, 5:1063-1088, 2004.
Bach , et al., "Optimization with Sparsity-Inducing Penalties," arXiv:1108.0775v2, Nov. 22, 2011.
Bahnsen, et al., "Feature Engineering Strategies for Credit Card Fraud Detection", Expert systems with applications Elsevier Jun. 1, 2016. https://www.sciencedirect.com/science/articie/abs/pii/S0957417415008386?via%3Dihub.
Barron-Romero, Carlos , "Classical and Quantum Algorithms for the Boolean Satisfiability Problem", CoRR, Abs/1510.02682 )Year:2015).
Bearman , et al., "What's the Point: Semantic Segmentation with Point Supervision". ECCV, Jul. 23, 2016. https://arxiv.org/abs/1506.02106.
Bell , et al., "The "Independent Components" of Natural Scenes are Edge Filters", Vision Res. 37(23) 1997,:pp. 3327-3338.
Bellman, R. E., "Dynamic Programming". Princeton University Press, Princeton, NJ. Republished 2003: Dover, ISBN 0-486-42809-5.
Bhattacharyya , et al., "Data mining for credit card fraud: A comparitive study", Decision Support Systems 2011. https://www.semanticscholar.org/paper/Data-mining-for-credit-card-fraud%3A-A-comparative-Bhattacharyya-Jha/9d26f0ba02ee5efe9b9c7bdcb5f528c8b8253cf7.
Bian , et al., "The Ising Model: teaching an old problem new tricks", D-wave systems. 2 (year 2010), 32 pages.
Bielza , et al., "Bayesian networks in neuroscience: a survey", Oct. 16, 2014, Frontiers in Computational Neuroscience, vol. 8, Article 131, p. 1-23 (Year: 2014).
Bolton , et al., "Statistical fraud detection: A review", Statistical Science 17(3) Aug. 1, 2002. https://projecteuclid.org/journals/statistical-science/volume-17/issue-3/Statistical-Fraud-Detection-A-Review/10.1214/ss/1042727940.full.
Burda , et al., "Importance Weighted Autoencoders", arXiv:1509.00519 Nov, 7, 2016. https://arxiv.org/abs/1509.00519.
Buss , "Introduction to Inverse Kinematics with Jacobian Transpose, Pseudoinverse and Damped Least Squares methods", Mathematics UCS 2004. https://www.math.ucsd.edu/~sbuss/ResearchWeb/ikmethods/iksurvey.pdf.
Chen , et al., "Domain Adaptive Faster R-CNN for Object Detection in the Wild". IEEE Xplore, 2018. https://arxiv.org/abs/1803.03243.

(56) References Cited

OTHER PUBLICATIONS

Chen, et al., "Stochastic Gradient Hamiltonian Monte Carlo", arXiv:1402.4102 May 12, 2014. https://arxiv.org/abs/1402.4102.
Cho, Kyunghyun, et al., "On the Properties of Neural Machine Translation: Encoder-Decoder Approaches", arXiv:1409.1259v2, [cs.CL] Oct. 7, 2014, 9 pages.
Cho, K-H., Raiko, T, & Ilin, A., "Parallel tempering is efficient for learning restricted Boltzmann machines", 2010.
Courbariaux, M., et al., "Binarized Neural Networks: Training Neural Networks with Weights and Activations Constrained to +1 or −1". http://arxiv.org/pdf/1602.02830.pdf.
Dai, et al., "Generative Modeling of Convolutional Neural Networks". ICLR 2015.
Doersch, "Tutorial on variational autoencoders", arXiv:1606.05908 Jan. 3, 2021. https://arxiv.org/abs/1606.05908.
Dumoulin, et al., "On the Challenges of Physical Implementations of RBMs", https://arxiv.org/abs/1312.5258v2, Oct. 28, 2014.
Fabius, Otto, et al., "Variational Recurrent Auto-Encoders", Accepted as workshop contributions at ICLR 2015, 5 pages.
Fischer, A. & Igel, C., "A bound for the convergence rate of parallel tempering for sampling restricted Boltzmann machines", 2015.
Friedman, et al., "Learning Bayesan Networks from Data", Stanford Robotics, http://robotics.stanford.edu/people/nir/tutorial/index.html.
G. Hinton, N. Srivastava, et. al, "Improving neural networks by preventing co-adaptation of feature detectors". CoRR, abs/1207.0580, 2012.
G.A. Rummery and M. Niranjan, "Online Q-Learning using Connectionist Systems". CUED/FINFENG/TR 166, Cambridge, UK, 1994.
Gal, et al., "Bayesian Convolutional Neural Networks With Bernoulli Approximate Variational Inference". arXiv:1506.02158v6, 2016.
Glynn, "Likelihood ratio gradient estimation for stochastic systems". Communications of the ACM, 1990. https://dl.acm.org/doi/10.1145/84537.84552.
Gomez-Bombarelli, et al., "Automatic chemical designs using a data-driven continuous representation of molecules", arXiv:1610.02415 Dec. 5, 2017. https://arxiv.org/abs/1610.02415.
Grathwohl, et al., "Backpropagation through the void: Optimizing control variates for black-box gradient etimation". arXiv:1711.00123, Feb. 23, 2018. https://arxiv.org/abs/1711.00123.
Gregor, et al., "Deep autoregressive networks". arXiv:1310.8499, May 20, 2014. https://arxiv.org/abs/1310.8499.
Gregor, Karol, et al., "DRAW: A Recurrent Neural Network For Image Generation", Proceedings of the 32nd International Conference on Machine Leaning, Lille, France, 2015, JMLR: W&CP vol. 37. Copyright 2015, 10 pages.
Gu, et al., "Muprop: Unbiased backpropagation for stochastic neural networks", arXiv:1511,05176, Feb. 25, 2016, https://arxiv.org/abs/1511.05176.
Hamze, "Sampling From a Set Spins With Clamping". U.S. Appl. No. 61/912,385, filed Dec. 5, 2013, 35 pages.
Hees, "Setting up a Linked Data mirror from RDF dumps", Jörn's Blog, Aug. 26, 2015. SciPy Hierarchical Clustering and Dendrogram Tutorial | Jörn's Blog (joernhees.de).
Heess, N., et al., "Actor-Critic Reinforcement Learning with Energy-based Policies". JMLR, 24:43-57, 2012.
Heidrich-Meisner, et al., "Reinforcement Learning in a Nutshell". http://image.diku.dk/igel/paper/RLiaN.pdf.
Hidasi, et. al., "Session-based recommendations with recurrent neural networks", ICRL Mar. 29, 2016. https://arxiv.org/abs/1511.06939.
Hinton, Geoffrey, "A Practical Guide to Training Restricted Boltzmann Machines", Version 1, Department of Computer Science University of Toronto, Aug. 2, 2010, 21 pages.
Hurley, Barry, et al., "Proteus: A hierarchical Portfolio of Solvers and Transformations", arXiv: 1306.5606v2 [cs.AI], Feb. 17, 2014, 17 pages.

Hinton, Geoffrey E, et al., "Autoencoders, Minimum Description Length and Helmholtz Free Energy", Department of Computer Science, University of Toronto, Computation Neuroscience Laboratory, The Salk Institute, Mar. 1, 2001, 9 pages.
Hinton, Geoffrey E, et al., "Reducing the Dimensionality of Data with Neural Networks", Science, wwwsciencemag.org, vol. 313, Jul. 28, 2006, pp. 504-507.
Humphrys, M., http://computing.dcu.ie/ humphrys/PhD/ch2.html.
"On the Challenges of Physical Implementations of RBMs", arXiv:1312.5258V1 [stat.ML] Dec. 18, 2013, XP-002743443, 9 pages.
Adachi, S.H. et al., "Application of Quantum Annealing to Training of Deep Neural Networks," URL:https://arxiv.org/ftp/arxiv/papers/151 0/1510.06356.pdf, Oct. 21, 2015, 18 pages.
Amin, "Effect of Local Minima on Adiabatic Quantum Optimization," Physical Review Letters 100(130503), 2008, 4 pages.
Hjelm, "Boundary-Seeking Generative Adversarial Networks", arXiv:1702.08431v4 [stat.ML], 17 pages, Feb. 21, 2018.
International Search Report and Written Opinion for PCT/US2018/065286, dated Apr. 16, 2019, 11 pages.
International Search Report and Written Opinion for PCT/US2019/017124, dated May 30, 2019, 28 pages.
International Search Report, dated May 10, 2017, for International Application No. PCT/US2017/015401, 3 pages.
International Search Report, dated Nov. 18, 2016, for International Application No. PCT/US2016/047627, 3 pages.
Jaakkola et al., "Improving the Mean Field Approximation Via the Use of Mixture Distributions," 1998, 11 pages.
Jenatton, R. et al., "Proximal Methods for Hierarchical Sparse Coding," arXiv:1009.2139v4 [stat.ML], Jul. 5, 2011, 38 pages.
Katzgraber et al., "Glassy Chimeras Could Be Blind to Quantum Speedup: Designing Better Benchmarks for Quantum Annealing Machines," Physical Review X(4):021008, 2014, (8 pages).
Khalek, S. et al., "Automated SQL Query Generation for Systematic Testing of Database Engines," ASE '10: Proceedings of the IEEE/ACM international conference on Automated software engineering, 2010, 4 pages.
Krähenbühl, P. et al., "Efficient Inference in Fully Connected CRFs with Gaussian Edge Potentials," arXiv:1210.5644 [cs.CV], 2012, 9 pages.
Kuželka, O. et al., "Fast Estimation of First-Order Clause Coverage through Randomization and Maximum Likelihood," ICML '08: Proceedings of the 25th international conference on Machine learning, 2008, 8 pages.
Lafferty, J. et al., "Conditional Random Fields: Probabilistic Models for Segmenting and Labeling Sequence Data," Proceedings of the 18th International Conference on Machine Learning 2001, 10 pages.
Li, X., et al., "Collaborative Variational Autoencoder for Recommender Systems," Published in KDD, Halifax, NS, Canada, Aug. 13-17, 2017, pp. 305-314.
Minh, V. et al., "Learning to Label Aerial Images from Noisy Data," Proceedings of the 29th International Conference on Machine Learning, Edinburgh, Scotland, 2012, 8 pages.
Mirza et al., "Conditional Generative Adversarial Nets", arXiv:1411.1784v1 [cs.LG], 7 pages, Nov. 6, 2014.
Mocanu et al., "A topological insight into restricted Boltzmann machines," Pre-print version: arXiv:1604.05978v2: Jul. 2016. (25 pages).
Murray, I. et al., "Bayesian Learning in Undirected Graphical Models: Approximate MCMC Algorithms," UAI '04: Proceedings of the 20th conference on Uncertainty in Artificial Intelligence, 2004, 8 pages.
Natarajan, N. et al., "Learning with Noisy Labels," Advances in Neural Information Processing Systems 26, 2013, 9 pages.
Neven, H. et al., "QBoost: Large Scale Classifier Training with Adiabatic Quantum Optimization," JMLR: Workshop and Conference Proceedings 25, 2012, 16 pages.
Paninski, "Estimation of Entropy and Mutual Information," Neural Computation 15:1191-1253, 2003.
Prakash, "Quantum Algorithms for Linear Algebra and Machine Learning," Doctoral Thesis, Technical Report No. UCB/EECS-2014-211, University of California at Berkeley, 2014, pp. 1-9.

(56) References Cited

OTHER PUBLICATIONS

Quattoni, A. et al., "Hidden Conditional Random Fields," IEEE Transactions on Pattern Analysis and Machine Intelligence, 29(10), 2007, 6 pages.
Reed, et al., "Training Deep Neural Networks on Noisy Labels with Bootstrapping," arXiv:1412.6596v3 [cs.CV] Apr. 15, 2015, 11 pages.
Rezende, et al., "Stochastic Backpropagation and Approximate Inference in Deep Generative Models," arXiv:1401.4082v3 [stat.ML] May 30, 2014, 14 pages.
Rolfe et al., "Discrete Variational Auto-Encoder Systems and Methods for Machine Learning Using Adiabatic Quantum Computers," United States U.S. Appl. No. 62/462,821, filed Feb. 23, 2017, 113 pages.
Rolfe et al., "Discrete Variational Auto-Encoder Systems and Methods for Machine Learning Using Adiabatic Quantum Computers," United States U.S. Appl. No. 62/404,591, filed Octobers, 2016, 87 pages.
Rolfe et al., "Systems and Methods for Machine Learning Using Adiabatic Quantum Computers," U.S. Appl. No. 62/207,057, filed Aug. 19, 2015, 39 pages.
Rolfe, "Discrete Variational Auto-Encoder Systems and Methods for Machine Learning Using Adiabatic Quantum Computers," U.S. Appl. No. 62/206,974, filed Aug. 19, 2015, 43 pages.
Rolfe, "Discrete Variational Auto-Encoder Systems and Methods for Machine Learning Using Adiabatic Quantum Computers," U.S. Appl. No. 62/268,321, filed Dec. 16, 2015, 52 pages.
Rolfe, "Discrete Variational Auto-Encoder Systems and Methods for Machine Learning Using Adiabatic Quantum Computers," U.S. Appl. No. 62/307,929, filed Mar. 14, 2016, 67 pages.
Rose et al., "First ever DBM trained using a quantum computer", Hack the Multiverse, Programming quantum computers for fun and profit, XP-002743440, Jan. 6, 2014, 8 pages.
Ross, S. et al., "Learning Message-Passing Inference Machines for Structured Prediction," CVPR 2011,2011,8 pages.
Scarselli, F. et al., "The Graph Neural Network Model," IEEE Transactions on Neural Networks, vol. 20, No. 1,2009, 22 pages.
Spall, "Multivariate Stochastic Approximation Using a Simultaneous Perturbation Gradient Approximation," IEEE Transactions on Automatic Control 37(3):332-341, 1992.
Strub, F., et al. "Hybrid Collaborative Filtering with Autoencoders," arXiv:1603.00806v3 [cs.IR], Jul. 19, 2016, 10 pages.
Sukhbaatar et al., "Training Convolutional Networks with Noisy Labels," arXiv:1406.2080v4 [cs.CV] Apr. 10, 2015, 11 pages.
Tieleman, T., "Training Restricted Boltzmann Machines using Approximation to the Likelihood Gradient," ICML '08: Proceedings of the 25th international conference on Machine learning, 2008, 8 pages.
Van Baalen, M. "Deep Matrix Factorization for Recommendation," Master's Thesis, Univ.of Amsterdam, Sep. 30, 2016, URL: https://scholar.google.co.kr/scholar?q=Deep+Matrix+Factorization+for+Recommendation&hl=ko&as_sdt=O&as_vis=I&oi=scholar, 99 pages.
van der Maaten, L. et al., "Hidden-Unit Conditional Random Fields," Journal of Machine Learning Research 15, 2011, 10 Pages.
Venkatesh, et al., "Quantum Fluctuation Theorems and Power Measurements," New J. Phys., 17, 2015, pp. 1-19.
Wang, Discovering phase transitions with unsupervised learning, Physical Review B 94, 195105 (2016), 5 pages.
Williams, "Simple Statistical Gradient-Following Algorithms for Connectionist Reinforcement Learning," College of Computer Science, Northeastern University, Boston, MA, 1992, 27 pages.
Written Opinion of the International Searching Authority, dated Nov. 18, 2016, for International Application No. PCT/US2016/047627, 9 pages.
Zhu, X. et al., "Combining Active Learning and Semi-Supervised Learning Using Gaussian Fields and Harmonic Functions," ICML 2003 workshop on the Continuum from Labeled to Unlabeled Data in Machine Learning and Data Mining, 2003, 8 pages.
Rezende, Danilo J, et al., "Variational Inference with Normalizing Flows", Proceedings of the 32nd International Conference on Machine Learning, Lille, France 2015, JMLR: W&CP vol. 37, 9 pages.
Rolfe, "Discrete variational autoencoders" arXiv:1609.02200 Apr. 22, 2017. https://arxiv.org/abs/1609.02200.
Rose, et al., "Systems and Methods for Quantum Processing of Data, for Example Functional Magnetic Resonance Imaging Data". U.S. Appl. No. 61/841,129, filed Jun. 28, 2013, 129 pages.
Rose, et al., "Systems and Methods for Quantum Processing of Data, for Example Imaging Data". U.S. Appl. No. 61/873,303, filed Sep. 3, 2013, 38 pages.
Salakhutdinov, R., "Learning deep Boltzmann machines using adaptive MCMC", 2010. c
Salakhutdinov, R., "Learning in Markov random transitions.elds using tempered", 2009.
Salakhutdinov, R. & Murray, I., "On the quantitative analysis of deep belief networks", 2008.
Saliman, Tim, "A Structured Variational Auto-encoder for Learning Deep Hierarchies of Sparse Features", arXiv:1602.08734v1 [stat.ML] Feb. 28, 2016, 3 pages.
Salimans, Tim, et al., "Markov Chain Monte Carlo and Variational Inference: Bridging the Gap", arXiv:1410.6460v4 [stat.CO] May 19, 2015, 9 pages.
Schulman, et al., "Gradient estimation using stochastic computing graphs". arXiv:1506.05254, Jan. 5, 2016. https://arxiv.org/abs/1506.05254.
Schwartz-Ziv, et al., "Opening the black box of Deep Neural Networks via Information", arXiv:1703.00810 Apr. 29, 2017. https://arxiv.org/abs/1703.00810.
Sethi, et al., "A revived survey of various credit card fraud detecion techniques", International Journal of Computer Science and Mobile Computing Apr. 14, 2014. https://tarjomefa.com/wp-content/uploads/2018/08/TarjomeFa-F994-English.pdf.
Shahriari, et al., "Taking the human out of the loop: A review of bayesian optimization", Proceedings of the IEEE 104 Jan. 1, 2016.
Silver, et al., "Mastering the game of Go with deep neural networks and tree search". Nature, 529, 484489, 2016.
Smelyanskiy, et al., "A near-term quantum computing approach for hard computational problems in space exploration" arXiv preprint arXir:1204.2821 (year:2012).
Sonderby, et al., "Ladder Variational Autoencoders", arXiv:1602.02282v3 [stat.ML] May 27, 2016, 12 pages.
Sprechmann, et al., "Dictionary learning and sparse coding for unsupervised clustering", in 2010 IEEE international conference on acoustics, speech and signal processing (pp. 2042-2045) IEEE (year:2010).
Sutton, "Learning to Predict by the Methods of Temporal Differences". https://webdocs.cs.ualberta.ca/sutton/papers/sutton-88-with-erratum.pdf.
Sutton, R., et al., "Policy gradient methods for reinforcement learning with function approximation". Advances in Neural Information Processing Sytems, 12, pp. 1057-1063, MIT Press, 2000.
Suzuki, et al., "Joint Multimodal Learning With Deep Generative Models", Nov. 7, 2016, arXiv:1611.0189v1 (Year 2016).
Szegedy, et al., "Rethinking the Inception Architecture for Computer Vision", 2016, Proceedings of the IEEE Conference on Computer Vision and Pattern Recognition (CVPR), pp. 2818-2826 (Year: 2016).
Tieleman, T. & Hinton, G., "Using fast weights to improve persistent contrastive divergence", 2009.
Tokui, et al., "Evaluating the variance of likelihood-ratio gradient estimators", Proceedings of the 34th International Conference on Machine Learning, 2017. http://proceedings.mlr.press/v70/tokui17a.html.
Tripathi, et al., "Survey on credit card fraud detection methods", International Journal of Emerging Technology and Advanced Engineering Nov. 12, 2012.
Tucker, et al., "Rebar: Low-variance, unbiased gradient estimates for discrete latent variable models". arXiv:1703.07370, Nov. 6, 2017. https://arxiv.org/abs/1703.07370.
Vahdat, "Machine Learning Systems and Methods for Training With Noisy Labels," U.S. Appl. No. 62/427,020, filed Nov. 28, 2016, 30 pages.
Vahdat, "Machine Learning Systems and Methods for Training With Noisy Labels," U.S. Appl. No. 62/508,343, filed May 18, 2017, 46 pages.

(56) References Cited

OTHER PUBLICATIONS

Vahdat, "Toward Robustness against Label Noise in Training Deep Disciminative Neural Networks". arXiv:1706.00038v2, Nov. 3, 2017. https://arxiv.org/abs/1706.00038.

Vahdat, et al., "Dvae++: Discrete variational autoencoders with overlapping transformations", arXiv:1802.04920 May 25, 2018. https://arxiv.org/abs/1802.04920.

Van Det Maaten, et al., "Hidden unit conditional random Fields". 14th International Conference on Artificial Intelligence and Statistics, 2011.

Veit, et al., "Learning From Noisy Large-Scale Datasets With Minimal Supervision". arXiv:1701.01619v2, Apr. 10, 2017. https://arxiv.org/abs/1701.01619.

Wan, L., et al., "Regularization of Neural Networks using DropConnec". ICML 2013.

Wang, et al., "Classification of common human diseases derived from shared genetic and environmental determinants", Nature Genetics Aug. 7, 2017. https://www.nature.com/articles/ng.3931.

Welling, et al., "Bayesian learning via stochastic gradient langevin dynamics", ICML Jun. 28, 2011. https://dl.acm.org/doi/10.5555/3104482.3104568.

Wiebe, Nathan, et al., "Quantum Inspired Training for Boltzmann Machines", arXiv:1507.02642v1 [cs.LG] Jul. 9, 2015, 18 pages.

Williams, "Simple Statistical Gradient-Following Algorithms for Connectionist Reinforcement Learning," College of Computer Science, Northeastern University, Boston, MA, 1992, 27 pages, https:/liink.springer.com/articlel/10.1007/BF00992696.

Wittek, Peter, "What Can We Expect from Quantum Machine Learning". Yandex 1-32 School of Data Analysis Conference Machine Learning: Prospects and Applications, Oct. 5, 2015. pp. 1-16.

Xiao, et al., "Learning from massive noisy labeled data for image classification". The IEEE Conference on Computer Vision and Pattern Recognition (CVPR) 2015.

Xie, et al., "A Theory of Generative ConvNet". ICML 2016.

Xing, "Bayesian and Markov Networks: A unified view", Carnegie Mellon: School of Computer Science Sep. 19, 2007. http://www.cs.cmu.edu/~epxing/Class/10708-07/Slides/lecture3-BN&MRF.pdf.

Zhang, Yichuan, et al., "Continuous Relaxations for Discrete Hamiltonian Monte Carlo", School of Informatic, University of Edinburgh, Dept of Engineering, University of Cambridge, United Kingdom, 9 pages.

Zheng, et al., "Graph regularized sparse coding for image representation", IEEE transaction on image processing, 20 (5), (Year: 2010) 1327-1336.

"An implementation of the high-throughput computing system using the GPU (005)", no English translations, 2019-516164, IEICE Technical Report, vol. 114 No. 302, Nov. 13-14, 2014, 12 pages.

"Cluster Analysis", UIUC, 2013.

"Neuro-computing for Parallel and Learning Information Systems", 2019-516164, www.jstage.jst.go.jp/article/sicej/1962/27/3/27_3_255/_article/-char/ja, Nov. 14, 2021, 17 pages.

Achille et Soatto, "Information Dropout: Learning Optimal Representations Through Noise" Nov. 4, 2016, ICLR, arXiv:1611.01353v1, pp. 1-12. (Year: 2016).

Hinton et al., "A Practical Guide to Training Restricted Boltzmann Machines," Springer, pp. 599-619, Jan. 1, 2012.

Hinton, Geoffrey E. . Training products of experts by minimizing contrastive divergence. Neural Computation, 14:1771-1800, 2002.

Hinton, Geoffrey, Simon Osindero, and Yee-Whye Teh. A fast learning algorithm for deep belief nets. Neural computation, 18(7):1527-1554, 2006.

International Search Report and Written Opinion of the International Searching Authority, dated Jan. 4, 2018, for International Application No. PCT/US2017/053303, 16 pages.

International Search Report and Written Opinion, dated Oct. 13, 2014, for international Application No. PCT/US2014/044421, 13 pages.

Jain et al., "Estimating the class prior and posterior from noisy positives and unlabeled data" Jun. 28, 2016, arXiv:1606.08561v1, pp. 1-19. (Year: 2016).

Japanese Office Action for Application No. JP 2019516164, dated Nov. 24, 2021, 33 pages (including English translation).

Jordan, Michael I., Zoubin Ghahramani, Tommi S Jaakkola, and Lawrence K Saul. An introduction to variational methods for graphical models. Machine learning, 37(2):183-233, 1999.

Ke et al., "Variational Convolutional Networks for Human-Centric Annotations" Nov. 20, 2016, pp. 120-135. (Year: 2016).

Korean Office Action for Application 10-2019-7012141, dated Nov. 29, 2021, 18 pages (including English translation).

Korenkevych et al., "Benchmarking Quantum Hardware for Training of Fully Visible Boltzmann Machines" Nov. 14, 2016, arXiv:1611.04528v1, pp. 1-22. (Year: 2016).

Le, Quoc, Marc'Aurelio Ranzato, Rajat Monga, Matthieu Devin, Greg Corrado, Kai Chen, Jeff Dean, and Andrew Ng. Building high-level features using large scale unsupervised learning. In ICML '2012, 2012.

LeCun, Y., L. Bottou, Y. Bengio, and P. Haffner. Gradient based learning applied to document recognition. Proc. IEEE, 1998.

Liu et Tao, "Classification with Noisy Labels by Importance Reweighting" Mar. 2016, pp. 447-461. (Year: 2016).

Long, Philip M and Rocco Servedio. Restricted boltzmann machines are hard to approximately evaluate or simulate. In Proceedings of the 27th International Conference on Machine Learning (ICML-10), pp. 703-710, 2010.

Menon et al., "Learning from Binary Labels with Instance-Dependent Corruption" May 4, 2016, pp. 1-41. (Year: 2016).

Miyata et al., "Consideration of 2D-FFT by Decomposition-of-Large Scale Data on Multi-GPU", IEICE Technical Report, vol. 114 No. 155, Computer Systems Jul. 28-30, 2014, Abstract, 12 pages.

Nalisnick, Eric, Lars Hertel, and Padhraic Smyth. "Approximate inference for deep latent gaussian mixtures." NIPS Workshop on Bayesian Deep Learning. vol. 2. 2016. (Year: 2016).

Niv, "Reinforcement Learning in the Brain". Journal of Mathematical Psychology, 2009—Elsevier.

Non-Finai Office Action Issued in U.S. Appl. No. 15/753,661 dated Dec. 9, 2021, 15 pages.

Non-Final Office Action Issued in U.S. Appl. No. 15/322,884 dated Feb. 17, 2022, 45 pages.

Non-Final Office Action issued in U.S. Appl. No. 16/336,625 dated Feb. 14, 2022, 22 pages.

Non-Final Office Action Issued in U.S. Appl. No. 16/562,192 dated Apr. 4, 2022, 37 pages.

Omidshafiei et al., "Hierarchical Bayesian Noise Inference for Robust Real-time Probabilistic Object Classification" Jul. 14, 2016, arXiv: 1605.01042v2, pp. 1-9. (Year: 2016).

Ororbia et al., "Online Semi-Supervised Learning with Deep Hybrid Boltzmann Machines and Denoising Autoencoders" Jan. 18, 2016, ICLR, arXiv: 1511.06964v7, pp. 1-17. (Year: 2016).

Sakkaris, et al., "QuDot Nets: Quantum Computers and Bayesian Networks", arXiv:1607.07887v1 [quant-ph] Jul 26, 2016, 22 page.

Salimans, Tim, and David A. Knowles. "Fixed-form variational posterior approximation through stochastic linear regression." Bayesian Analysis 8.4 (2013): 837-882. (Year: 2013).

Salimans, Tim. "A structured variational auto-encoder for learning deep hierarchies of sparse features." arXiv preprint arXiv: 1602.08734 (2016). (Year: 2016).

Serban et al., "Multi-Modal Variational Encoder-Decoders" Dec. 1, 2016, arXiv: 1612.00377v1, pp. 1-18. (Year: 2016).

Shah et al., "Feeling the Bern: Adaptive Estimators for Bernoulli Probabilities of Pairwise Comparisons" Mar. 22, 2016, pp. 1-33. Year: 2016).

Somma, R., S Boixo, and H Barnum. Quantum simulated annealing. arXiv preprint arXiv:0712.1008, 2007.

Somma, RD, S Boixo, H Barnum, and E Knill. Quantum simulations of classical annealing processes. Physical review letters, 101(13):130504, 2008.

Suzuki, "Natural quantum reservoir computing for temporal information processing", Scientific Reports, Nature Portfolio, Jan. 25, 2022.

(56) References Cited

OTHER PUBLICATIONS

Tosh, Christopher, "Mixing Rates for the Alternating Gibbs Sampler over Restricted Boltzmann Machines and Friends" Jun. 2016. Year: 2016).
Tucci, "Use of a Quantum Computer to do Importance and Metropolis-Hastings Sampling of a Classical Bayesian Network", arXiv:0811.1792v1 [quant-ph] Nov. 12, 2008, 41 pages.
Van de Meent, J-W., Paige, B., & Wood, "Tempering by subsampling", 2014.
Wang et al., "Paired Restricted Boltzmann Machine for Linked Data" Oct. 2016. (Year: 2016).
Wang, W., Machta, J., & Katzgraber, H. G. "Population annealing: Theory and applications in spin glasses", 2015.
Xu et Ou "Joint Stochastic Approximation Learning of Helmholtz Machines" Mar. 20, 2016, ICLR arXiv: 1603.06170v1, pp. 1-8. (Year: 2016).
Yoshihara et al., "Estimating the Trend of Economic Indicators by Deep Learning", 2019-516164, Graduate School of System Informatics, Kobe University, 28 Annual Conferences of Japanese Society for Artificial Intelligence 2014, 10 pages.
Zhang et al., "Understanding Deep Learning Requires Re-Thinking Generalization", arXiv:1611.03530 Feb. 26, 2017. https://arxiv.org/abs/1611.03530.
Zhao et al., "Towards a Deeper Understanding of Variational Autoencoding Models", arXiv:1702.08658 Feb. 28, 2017. https://arxiv.org/abs/1702.08658.
Zojaji et al., "A Survey of Credit Card Fraud Detection Techniques: Data and Technique Oriented Perspective", arXiv:1611.06439 Nov. 19, 2016. https://arxiv.org/abs/1611.06439.
Husmeier, "Introduction to Learning Bayesian Networks from Data", Probabilistic Modeling in Bioinformatics and Medical Informatics 2005. https://link.springer.com/chapter/10.1007/1-84628-119-9_2.
Jang, et al., "Categorical reparameterization with Gumbel-Softmax", arXiv:1611.01144 Aug. 5, 2017. https://arxiv.org/abs/1611.01144.
Jiang, et al., "Learning a discriminative dictionary for sparse coding via label consistent K-SVD", In CVPR 2011 (pp. 1697-1704) IEEE. June,Year 2011).
Khalek, Shadi A, et al., "Automated SQL Query Generation for Systematic Testing of Database Engines", In proceedings of the IEEE/ACM International Conference of Automated Software Engineering pp. 329-332. Association of Computing Machinery. (Year: 2008).
Kingma, et al., "Adam: A method for stochastic optimization", arXiv:1412.6980 Jan. 30, 2017. https://arxiv.org/abs/1412.6980.
Kingma, et al., "Auto-encoding variational bayes". arXiv:1312.5258v1, May 1, 2014. https://arxiv.org/abs/1312.6114.
Kingma, Diederik P, et al., "Semi-Supervised Learning with Deep Generative Models", arXiv:1406.5298v2 [cs.LG], Oct. 31, 2014, 9 pages.
Raymond, et al., "Systems and Methods for Comparing Entropy and KL Divergence of Post-Processed Samplers," U.S. Appl. No. 62/322,116, filed Apr. 13, 2016, 47 pages.
Korenkevych, et al., "Benchmarking quantum hardware for training of fully visible boltzmann machines", arXiv:1611.04528 Nov. 14, 2016. https://arxiv.org/abs/1611.04528.
Krause, et al., "The Unreasonable Effectiveness of Noisy Data for Fine-Grained Recognition", 2016, Springer International Publishing AG, ECCV 2016, Part III, LNCS 9907, pp. 301-320 (Year:2016).
Kuzelka, Ondrej, et al., "Fast Estimaticn of First-Order Clause Coverage through Randomization and Maximum Likelihood", In proceeding of the 25th International Conference on Machine Learning (pp. 504-5112). Association for Computing Machinery (Year:2008).
L.Wan, M. Zieler, et. al., "Regularization of Neural Networks using DropConnect". ICML, 2013.
Le Roux, Nicolas, et al., "Representational Power of Restricted Boltzmann Machines and Deep Belief Networks", Dept. IRO, University of Montreal Canada, Technical Report 1294, Apr. 18, 2007, 14 pages.
Lee, et al., "Efficient sparse coding algorithm", NIPS, 2007,pp. 801-808.
Rezende, et al., "Stochastic Backpropagation and Approximate Inference in Deep Generative Models," arXiv:1401.4082v3 [stat.ML] May 30, 2014, 14 pages. https://arxiv.org/abs/1401.4682.
Lee, H., et al., "Sparse deep belief net model for visual area v2". Advances in Neural Information Processing Systems, 20. MIT Press, 2008.
Li, et al., "R/'enyi Divergence Variational Inference", arXiv:1602.02311 Oct. 28, 2016. https://aixiv.org/abs/1602.02311.
Lin, et al., "Efficient Piecewise Training of Deep Structured Models for Semantic Segmentation". arXiv:1504.01013v4, 2016.
Lovasz, et al., "A Correction: orthogonal representations and connectivity of graphs", Linear Algebra and it's Applications 313:2000 pp. 101-105.
Lovasz, et al., "Orthogonal Representations and Connectivity of Graphs", Linear Algebra and its applications 114/115; 1989, pp. 439-454.
Macready, et al., "Applications of Hardware Boltzmann Fits". U.S. Appl. No. 61/515,742, filed Aug. 5, 2011, 11 ages.
Macready, et al., "Applications of Hardware Boltzmann Fits". U.S. Appl. No. 61/540, 208, filed Sep. 28, 2011, 12 pages.
Macready, et al., "Applications of Hardware Boltzmann Fits". U.S. Appl. No. 61/505,044, filed Jul. 6, 2011.
Macready, et al., "Systems and Methods for Minimizing an Objective Function". U.S. Appl. No. U.S. Appl. No. 61/557,783, filed Nov. 9, 2011, 26 pages.
Macready, et al., "Systems and Methods for Minimizing an Objective Function", U.S. Appl. No. 61/557,783, filed Nov. 9, 2011, 45 pages.
Maddison, et al., "The concrete distribution: A continuous relaxation of discrete random variables", arXiv:1611.00712 Mar. 5, 2017. https://arxiv.org/abs/1611.00712.
Makhzani, Alireza, et al., "Adversarial Autoencoders", arXiv:1511.05644v2 [cs.LG], May 25, 2016, 16 pages.
Mandt, et al., "A Variational Analysis of Stochastic Gradient Algorithms", arXiv:1602.02666 Feb. 8, 2016. https://arxiv.org/abs/1602.02666.
Misra, et al., "Seeing through the Human Reporting Bias: Visual Classifiers from Noisy Human-Centric Labels", 2016 IEEE Conference on Computer Vision and Pattern Recognition, IEEE, 2016, pp. 2930-2939.
Misra, et al., "Visual classifiers from noisy humancentric labels". In the IEEE Conference on Computer Vision and Pattern Recognition (CVPR), 2016.
Mnih, et al., "Neural variational inference and learning in belief networks". arXiv: 402.0030 Jun. 4, 2016. https://arxiv.org/abs/1402.0030.
Mnih, et al., "Variational inference for Monte Carlo objectives". arXiv: 1602.06725, Jun. 1, 2016. https://arxiv.org/abs/1602.06725.
Mnih, Andriy, et al., "Variational Inference for Mote Carlo Objectives", Proceedings of the 33rd International Conference on Machine Learning, New York, NY USA, 2016, JMLR: W&CP vol. 48, 9 pages.
Molchanov, Dmitry, et al., "Variational Dropout Sparsifies Deep Neural Networks", https://arxiv.org/pdf/1701.05369v1.pdf, Jan. 19, 2017.
Murphy, "A Brief Introduction to Graphical Models and Bayesian Networks", Oct. 14, 2001. https://www.cs.ubc.ca/~murphyk/Bayes/bayes_tutorial.pdf.
Murphy, "Machine Learning: a probalistic perspective", MIT Press, 2012. http://noiselab.ucsd.edu/ECE228/Murphy_Machine_Learning.pdf.
Muthukrishnan, et al., "Classical and quantum logic gates: an introduction to quantum computing", Quantum information seminar, )Year: 1999) 22 pages.
N. Srivastava, G. Hinton, et. al, "Dropout: A Simple Way to Prevent Neural Networks from Overtting". ICML 15 (Jun):19291958, 2014.
Neal, et al., "Meme Using Hamiltonian Dynamics", Handbook of Markov Chain Monte Carlo 2011.
Neven, et al., "Training a binary classifier with the quantum adiabatic algorithm", arXiv preprint arXivc:0811.0416, 2008, 11 pages.

(56) References Cited

OTHER PUBLICATIONS

Nowozin, Sebastian, et al., "f-GAN: Training Generative Neural Samplers using Variational Divergence Minimization", arXiv:1606.00709v1 [stat.ML], 17 pages., Jun. 2, 2016.
Olshausen, Bruno A, et al., "Emergence of simple cell receptive field properties by learning a sparse code for natural images", NATURE, vol. 381, Jun. 13, 1996, pp. 607-609.
Patrini, et al., Making Neural Networks robust to label noise: a loss correction approach. arXiv: 1609.03683 (2016).
Phua, et al., "A comprehensive survey", arXiv:1009.6119 Aug. 30, 2010. https://arxiv.org/abs/1009.6119.
Pozzolo, et al., "Learned Lessons in credit card fraud detection from a practitioner perspective", Feb. 18, 2014. https://www.semanticscholar.org/paper/Learned-lessons-in-credit-card-fraud-detection-from-Pozzolo-Caelen/6d2e2a1caf5b3757ed0e8f404eabb31546d5698a.
Rasmus, Antti , et al., "Semi-Supervised Learning with Ladder Networks", arXiv:1507.02672v2 [cs.NE] Nov. 24, 2015, 19 pages.
Office Action issued in Chinese Patent Application No. 2017800719346, dated Sep. 29, 2022, English translation, 9 pages.
Ren, et al., "Faster R-CNN: Towards Real-Time Object Detection with Region Proposal Networks", Microsoft Research, University of Science and Technology of China, 2015, 9 pages.
Blume-Kohout et al., "Streaming Universal Distortion-Free Entanglement Concentration"; IEEE Transactions on Information Theory Year: 2014; vol. 60, Issue 1; Journal Article' Publisher: IEEE; 17 pages.
Chen et al., "Variational Lossy Autoencoder" Nov. 8, 2016, arXiv: 1611.02731v1, pp. 1-13. (Year: 2016).
Covington, et al., "Deep Neural Networks for YouTube Recommendations", ReeSys '16, Sep. 15-19, 2016, Boston MA,8 pages.
Dziugaite, et al., "Neural Network Matrix Factorization", arXiv:1511.06443v2 [cs.LG] Dec. 15, 2015, 7 pages.
Kingma et al., "Improving Variational Inference with Inverse Autoregressive Flow" Jun. 15, 2016, arXiv:1606.04934v1, pp. 1-10. (Year: 2016).
Marlin, et al., "Collaborative Prediction and Ranking with Non-Random Missing Data", RecSys'09, Oct. 23-25, 2009, New York, New York, USA., 8 pages.
Non Final Office Action for U.S. Appl. No. 16/270,273, dated Jun. 27, 2022, 13 pages.
Non Final Office Action for U.S. Appl. No. 16/785,125, dated Aug. 8, 2022, 8 pages.
Notice of Allowance for U.S. Appl. No. 15/822,884, dated Aug. 8, 2022, 13 pages.
Notice of Allowance for U.S. Appl. No. 16/682,976, dated May 27, 2022, 11 pages.
Notice of Allowance for U.S. Appl. No. 16/714,103, dated Jun. 3, 2022, 9 pages.
Notice of Allowance for U.S. Appl. No. 16/772,094, dated Jun. 29, 2022, 12 pages.
Oord, et al., "Pixel Recurrent Neural Networks", 33rd International Conference on Machine Learning, New York, NY, USA, 2016. JMLR: W&CP vol. 48, 10 pages. 48.
Rolfe, Jason Tyler "Discrete Variational Autoencoders" Sep. 7, 2016, arXiv: 1609.02200v1, pp. 1-29. (Year: 2016).
Salakhutdinov, et al., "Restricted Boltzmann Machines for Collaborative Filtering", International Conference on Machine Learning, Corvallis, OR, 2007, 8 pages.
Sedhain, et al.,"AutoRec: Autoencoders Meet Collaborative Filtering", WWW 2015 Companion, May 18-22, 2015, Florence, Italy, 2 pages.
Van Rooyen, et al., "Learning with Symmetric Label Noise: The Importance of Being Unhinged" May 28, 2015, arXiv: 1505.07634v1, pp. 1-30. (Year: 2016).

* cited by examiner

SYSTEMS AND METHODS FOR DOMAIN ADAPTATION

FIELD

This disclosure generally relates to machine learning, and particularly to approaches for addressing domain adaptation problems.

BACKGROUND

Domain adaptation is a general class of problems in machine learning relating to mismatched training data and test data. Such mismatching can arise when, for example, a machine learning model is trained over data taken from one environment (the source domain) and then deployed in a different environment (the target domain). The machine learning model's performance may be degraded in the target domain relative to the source domain. In domain adaptation problems, the principal objective is usually to adapt a model trained in the source domain to perform well in the target domain.

An example field where domain adaptation problems can arise is in object detection. Object detection is a problem in machine learning relating to detecting objects represented in a data source, usually images or video. This is usually done by identifying a bounding box around objects of interest in an image or video. Differences in viewpoint, background, object appearance, scene type, illumination, or other aspects of the images or video between source and target domain may degrade performance—a classic domain adaptation problem. For instance, a model trained on images of sunny outdoor scenes may perform poorly when tested on foggy scenes which are otherwise similar. Similarly, a model trained on images from the United States may perform poorly when tested on images from China.

A direct approach for addressing such problems is to enlarge the source domain to encompass the target domain—that is, to use more comprehensive training data. For instance, one might attempt supervised model fine-tuning in the target domain. This generally involves providing additional labelled instances in the target domain to assist in training. Such approaches can be costly in terms of the financial or logistical costs of acquiring suitable data.

Recent work on addressing domain adaptation problems, particularly in the context of object detection, has focused on feature mapping approaches—that is, matching the representation of instances in the target domain with instances in the source domain. An example of such an approach is given by Chen et al., "Domain adaptive faster r-cnn for object detection in the wild", Proceedings of the IEEE Conference on Computer Vision and Pattern Recognition, pages 3339-3348 (2018). This unsupervised approach involves defining a mechanism for feature alignment and mapping representations between domains at some level of the model (such as in the input space, the hidden discriminate, or the generative feature space), which can be challenging to do effectively.

There is thus a general desire for systems and methods for addressing domain adaptation problems which improve the performance of machine learning models, and to improve machine performance, across domains relatively efficiently.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

Systems and methods for training a machine learning system are provided. The machine learning system is trained over an input space based on a training dataset comprising items in a source domain and associated ground-truth labels and a test dataset comprising items in a target domain. The method is executed by at least one processor in communication with at least one memory. The method comprises training a primary model in the at least one memory based on at least a first item of the training dataset and an associated first label; instantiating an ancillary model in the at least one memory, the ancillary model operable to classify objects in the input space with an associated confidence based on one or more parameters of the ancillary model; and retraining the one or more parameters of the primary model based on the test dataset. Retraining comprises: generating a prediction based on at least a second item of the test dataset by the primary model; generating an ancillary confidence associated with the prediction by the ancillary model; determining a value of an objective function based on the prediction and the ancillary confidence; and updating at least one of the one or more parameters of the primary model based on the value of the objective function.

In some implementations, the primary model comprises an object-detection model, the input space comprises at least one of: images and video, and generating a prediction based on at least the second item comprises generating, for at least the second item, a bounding box and an associated object classification.

In some implementations, generating the ancillary confidence associated with the prediction comprises extracting from the bounding box an extracted item comprising at least one of: an image and a video; and classifying the extracted item by the ancillary model.

In some implementations, retraining the one or more parameters of the primary model comprises retraining the one or more parameters of the primary model based on a training item from the training dataset, a ground-truth label associated with the training item, and a test item from the test dataset; and determining the value of the objective function comprises: determining a first value of the objective function based on the test item, the bounding box of prediction of the primary model, and the ancillary confidence of the ancillary model; determining a second value of a second objective function based on the training item and the associated ground-truth label; and determining the value of the object function based on the first and second values.

In some implementations, the prediction comprises a predicted confidence and wherein determining the value of the objective function comprises determining a first value based on the predicted confidence, determining the second value based on the ancillary confidence, and determining the value of the objective function comprises determining the value of the objective function based on the first and second values.

In some implementations, determining the value of the objective function comprises scaling the second value relative to the first value by a scaling factor.

In some implementations, determining the value of the objective function comprises annealing the scaling factor from an initial value at a first stage of retaining to a later value at a second stage of retaining after the first stage of retraining.

In some implementations, scaling the second value relative to the first value comprises determining a geometric mean of the first and second terms parametrized by the scaling factor.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Introductory Generalities

Figure 1:
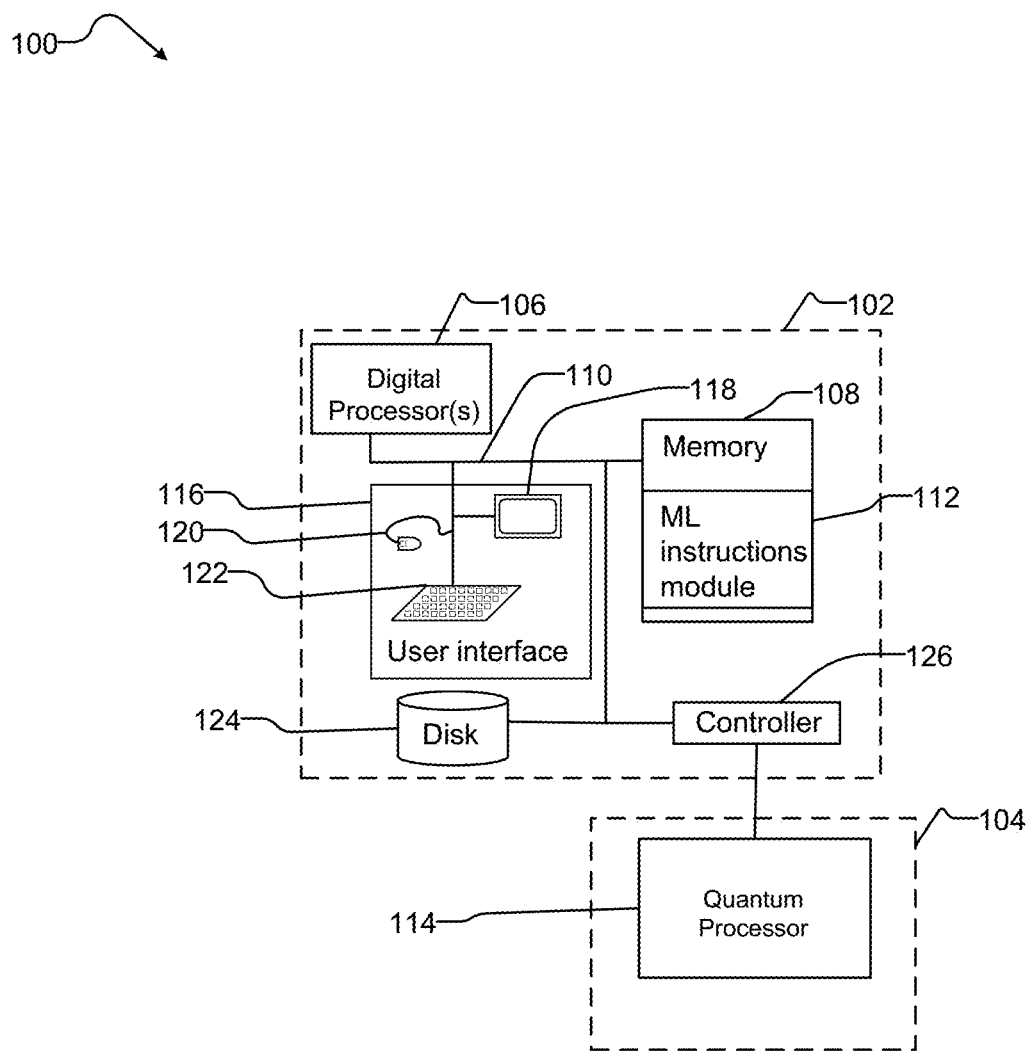
FIG. 1 is schematic diagram of an example computing system for executing the methods disclosed herein.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Overview

Aspects of the present disclosure provide systems and methods for addressing the domain adaptation problem based on a training technique involving using the predictions of a trained model over both source and target domains to retain the model (e.g., with the assistance of an auxiliary model and/or a modified objective function). This is based on a key insight: although a model trained in the source domain will tend to have inferior performance in the target domain, it will generally retain some accuracy in the target domain. Inaccuracy in the model's predictions in the target domain can be treated as a kind of noise and can be reduced by using a robust learning framework during retraining, such as the robust labelling framework described in U.S. Patent Publication No. US20180150728A1. This allows for unsupervised training in the target domain without necessarily explicitly defining feature maps between the domains.

The present disclosure is not restricted to object detection models, although various exemplary implementations relate to object detection. In some such implementations, noise in retraining is reduced by explicitly representing label noise (e.g., assigning objects one label when another label should apply) and geometry noise (e.g., drawing a bounding box with incorrect location and/or size, for instance such that the bounding box does not enclose the corresponding object) in the objective function. This tends to facilitate the refinement of noisy predictions in the target domain by providing the model with a mechanism to change bounding box class labels during retraining based on the model's current belief of labels in the target domain and the classifier's beliefs (which may draw on different information sources).

Computing Systems

FIG. 1 illustrates a computing system 100 comprising a digital computer 102. The example digital computer 102 includes one or more digital processors 106 that may be used to perform classical digital processing tasks. Digital computer 102 may further include at least one system memory 108, and at least one system bus 110 that couples various system components, including system memory 108 to digital processor(s) 106. System memory 108 may store a machine learning instructions module 112.

The digital processor(s) 106 may be any logic processing unit or circuitry (e.g., integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations, computing system 100 comprises an analog computer 104, which may include one or more quantum processors 114. Digital computer 102 may communicate with analog computer 104 via, for instance, a controller 126. Certain computations may be performed by analog computer 104 at the instruction of digital computer 102, as described in greater detail herein.

Digital computer 102 may include a user input/output subsystem 116. In some implementations, the user input/output subsystem includes one or more user input/output components such as a display 118, mouse 120, and/or keyboard 122.

System bus 110 can employ any known bus structures or architectures, including a memory bus with a memory controller, a peripheral bus, and a local bus. System memory 108 may include non-volatile memory, such as read-only memory ("ROM"), static random access memory ("SRAM"), Flash NAND; and volatile memory such as random access memory ("RAM") (not shown).

Digital computer 102 may also include other non-transitory computer- or processor-readable storage media or non-volatile memory 124. Non-volatile memory 124 may take a variety of forms, including: a hard disk drive for reading from and writing to a hard disk (e.g., magnetic disk), an optical disk drive for reading from and writing to removable optical disks, and/or a solid state drive (SSD) for reading from and writing to solid state media (e.g., NAND-based Flash memory). The optical disk can be a CD-ROM or DVD, while the magnetic disk can be a rigid spinning magnetic disk or a magnetic floppy disk or diskette. Non-volatile memory 124 may communicate with digital processor(s) via system bus 110 and may include appropriate interfaces or controllers 126 coupled to system bus 110. Non-volatile memory 124 may serve as long-term storage for processor- or computer-readable instructions, data structures, or other data (sometimes called program modules) for digital computer 102.

Although digital computer 102 has been described as employing hard disks, optical disks and/or solid state storage media, those skilled in the relevant art will appreciate that other types of nontransitory and non-volatile computer-readable media may be employed, such magnetic cassettes, flash memory cards, Flash, ROMs, smart cards, etc. Those skilled in the relevant art will appreciate that some computer architectures employ nontransitory volatile memory and nontransitory non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the digital computer 102 and analog computer 104. Also for example, system memory 108 may store at least one of processor executable instructions or data that, when executed by at least one processor, causes the at least one processor to execute the various algorithms described elsewhere herein, including machine learning related algorithms. For instance, system memory 108 may store a machine learning instructions module 112 that includes processor- or computer-readable instructions to provide a machine learning model. Such provision may comprise training and/or performing inference with a convolutional neural network and/or other machine learning model, e.g., as described in greater detail herein.

Models for Domain Adaptation

Figure 2:
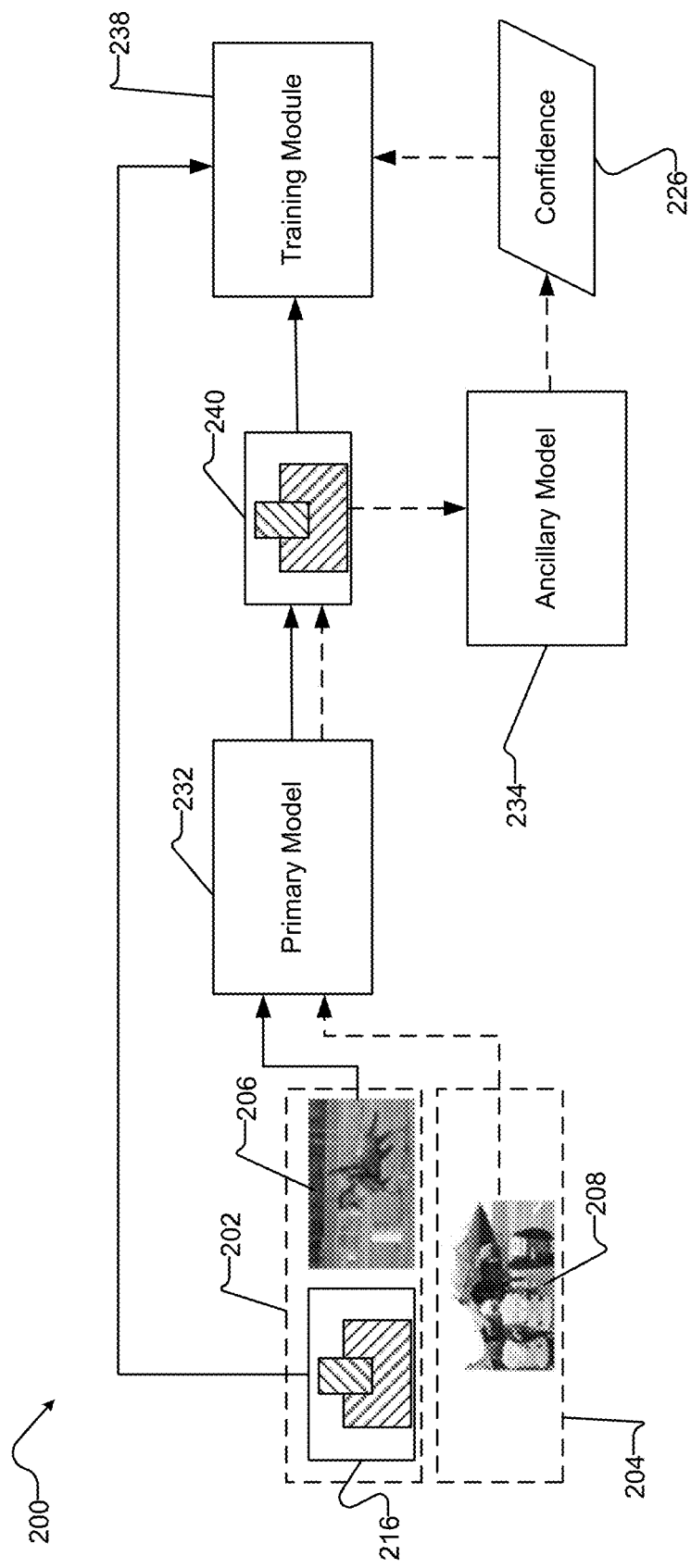
FIG. 2 is a schematic diagram of an example machine learning model having an ancillary model for generating confidence values based on primary model predictions.

FIG. 2 shows schematically an example machine learning model 200. Model 200 has access to a training data dataset 202 having items 206 and corresponding ground truth labels 216 and a test dataset 204 having items 208. For example, where items 206 are images, labels 216 may comprise bounding boxes of class instances. For instance, the exemplary FIG. 2 shows a first bounding box containing the area in which a person is found and a second bounding box containing the area in which a horse is found; these could be respectively labelled "person" and "horse". In such bounding box-based implementations model 200 may, for example, comprise an object detection model which receives images and outputs predictions of corresponding bounding boxes for class instances identified in the images.

Figure 3:
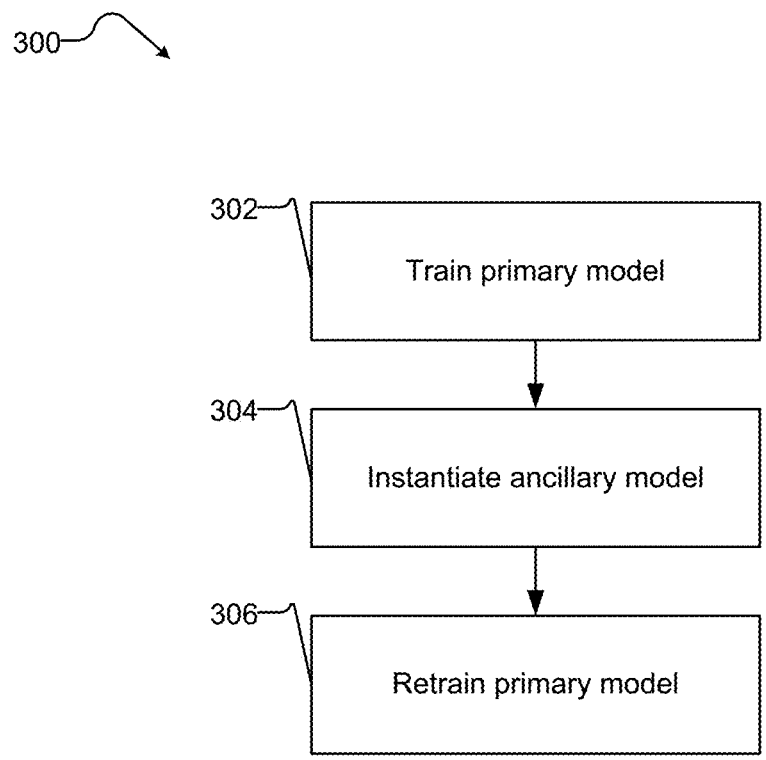
FIG. 3 is a flowchart of an example method for training the example machine learning model of FIG. 2.

In some implementations, model 200 is trained in three acts, illustrated in FIG. 3 as method 300. In act 302, primary model 232 is trained over training dataset 202 (corresponding to the source domain $\mathcal{S}$). This involves ingesting items 206, generating predictions 240 as output, and updating parameters via training module 238 based on ground-truth labels 216 (e.g., by optimizing a cross-entropy loss term over the parameters of primary model 232), as described above. For example, predictions 240 may comprise bounding boxes, each having an associated confidence (e.g., the horse bounding box might have an associated confidence of 0.9). Generating predictions may comprise, for example, processing items 206 via a convolutional neural network or other suitable machine learning models. Primary model 232 can be represented as a distribution $p$ defined over the space of all possible predictions 240 conditioned on its inputs and its parameters $\phi$. This can be written in terms of pointwise probabilities as $p(y|x, \phi)$, where y is a prediction for a given input x. In at least some object-detection implementations, predictions y can be decomposed into class predictions $y_c$ (for predicting the class of an object, such as "person" or "horse") and geometry predictions $y_g$ (for predicting the geometry of an object, such as its size and location).

Primary model 232 may comprise, for example, a Faster R-CNN, such as is described by Ren et al., "Faster r-cnn: Towards real-time object detection with region proposal networks", in Advances in neural information processing systems, pages 91-99 (2015). Such a model may be trained by, for example, minimizing a loss function of the form:

$$\mathcal{L} = \mathcal{L}_o + \mathcal{L}_g + \mathcal{L}_c$$

where $\mathcal{L}_o$ is an objective function for an "objectness" classifier (which classifies proposals as objects or background) in a region proposal network of the Faster R-CNN and may comprise a cross entropy loss, $\mathcal{L}_g$ is a measure of geometric (or localization) error and may comprise a class-agnostic agnostic regression loss, and $\mathcal{L}_c$ is a measure of the accuracy of predicted object category labels and may comprise a cross-entropy loss.

In act 304, ancillary model 234 is instantiated in a memory of computing system 100. Ancillary model 234 is a classification model which receives predictions 240 as input and outputs confidence determinations 226. For example, ancillary model 240 may receive images extracted from the bounding boxes of predictions 240 and, for each bounding box, generate its own confidence determination 226. Ancillary model 234 can be represented as a distribution $p_{anc}$ defined over the space of all possible predictions conditioned on its inputs (e.g., items 206, 208 and/or subsets thereof) and its parameters $\theta$.

Ancillary model 234 may be trained independently of primary model 232 based on a corresponding objective function (which may differ from an objective function used to train primary model 232). Indeed, ancillary model 234 may be based on a different architecture than primary model 232. Ancillary model 234 may be trained by any suitable method—for example, ancillary model 234 may be generated by obtaining a pretrained image classifier or any suitable oracle. Optionally, parameters $\theta$ of ancillary model 234 may be fine-tuned via further training over relevant data (e.g., a validation set in the target domain $\mathcal{T}$ with ground-truth labels, public datasets with suitable annotations, etc.).

At act 306, ancillary model 234 is used by training module 238 to assist in retraining primary model 232.

Primary model 232 is trained over test dataset 204, optionally in combination with training dataset 202. In some implementations, primary model 232 is retrained over both datasets 202 and 204 in minibatches, with items from each dataset 202 and 204 present in each minibatch. Primary model 232 may be trained by optimizing an objective function based on a fully-supervised objective term defined over training dataset 202 (corresponding to the source domain $\mathcal{S}$) and an unsupervised objective term defined over test dataset 204 (corresponding to the test domain $\mathcal{T}$).

At a high level, training module 238 can retrain primary model 232 over items 208 in test dataset 204 by generating one or more confidence determinations 226 for each prediction 240 and using confidence determinations 226 as ground-truth labels for items 208. In some implementations wherein primary model 232 is also retrained over items 206 in training dataset 202, labels 216 are used for ground-truth by training module 238. Retraining primary model 232 over both datasets 202 and 204 helps to keep the model distribution close to the distribution implied by ground-truth labels 216 while also incorporating representation provided by ancillary model 234.

In some implementations, primary model 232 is retrained over items in test dataset 204 based on an inferred distribution q. (In some implementations, primary model 232 is additionally trained over items in training dataset 202 based on the same distributions and objective functions as were used in the training of act 302—that is, different distributions and/or objective functions may be used for training over different datasets.) In some implementations, q is a weighted combination of $p$ and $p_{anc}$. Primary model 232 may be trained over test dataset 204 based on one or more objective functions defined in terms of q. For example, in at least some implementations where primary model 232 generates predicted classes $y_c$ and geometries $y_g$ is trained over items 206 in training dataset 202 based on:

$$\min_q KL(q(y) || p(y|x, \bar{y})) + \alpha KL(q(y) || p_{anc}(y|x, \bar{y}))$$

where KL is the Kullback-Leibler divergence, a is a scalar parameter for relatively weighting the first and second terms, x is a relevant item 206 or 208, and ỹ denotes the confidence determinations 226 for prediction 240 corresponding to x. The first term encourages q to be close to primary model 232 and is trained over training dataset 202. The second term encourages q to be close to ancillary model 234 and is trained over test dataset 204.

In some object detection implementations where $y=(y_c, y_g)$, each prediction $y_c$, $y_g$ is trained based on a corresponding objective function. For example, primary model 232 may be trained for class predictions $y_c$ based on:

$$\min_q KL(q(y_c) || p(y_c|x, \bar{y}_g)) + \alpha KL(q(y_c) || p_{anc}(y|x, \bar{y}_g))$$

and for geometry predictions $y_g$ based on:

$$\min_q KL(q(y_g) || p(y_g|x, \bar{y}_g)) + \alpha KL(q(y_g) || p_{anc}(y_g|x, \bar{y}_g))$$

where $\bar{y}_g$ is a bounding box in image x generated by primary model 232. For instance, primary model 232 may be trained over an objective function which includes the above two terms, e.g., by substituting them for the $\mathcal{L}_c$ and $\mathcal{L}_g$ terms, respectively. (Additional or alternative terms, such as $\mathcal{L}_o$, may optionally be provided).

In some implementations, such as the above examples, the contribution of the $p_{anc}$ term is scaled to adjust the degree to which primary model 232 relies on test dataset 204 in training. For example, the second term may be multiplied by a scaling factor α; setting α<1 will tend to reduce the effect of test dataset 204 (and this prioritize training dataset 202) and setting α>1 will tend to have the opposite effect. Since $p$ will generally be less accurate early in (re)training and more accurate later on, in some implementations $p_{anc}$ is given a greater weight than $p$ at the beginning of training and reducing it to a lower value by the end of training, e.g., by annealing.

In some implementations, q is parametrized solely by θ and φ. Training q therefore results in retraining primary model 232; indeed, an explicit model q need not be instantiated, and primary model 232 may be trained by updating its parameters are dictated by the objective function for q. However, solutions to the foregoing objective functions may be expressed in terms of q and thus may be used by training module 238 to facilitate training. For example, q may be defined as the geometric mean of those distributions. Depending on the distributions of $p$ and $p_{anc}$, the formulation of q may be different for $y_c$ and $y_g$.

In some implementations where $p$ and $p_{anc}$ are categorical distributions over a component of y ($y_c$ is used here without loss of generality) and q is based on a geometric mean, the distribution of q over $y_g$ may be defined as follows:

$$q(y_c) \propto (p(y_c|x, y_g) p_{anc}^\alpha(y_c|x, y_g))^{\frac{1}{\alpha+1}}$$

In some implementations where $p$ and $p_{anc}$ are Normal distributions with a shared covariance matrix Σ over a component of y ($y_g$ is used here without loss of generality) and q is based on a geometric mean, the distribution of q over $y_g$ may be defined as follows:

$$q(y_g) \propto \mathcal{N}\left(y_g; \frac{y_g + \alpha y_g}{\alpha + 1}, \Sigma\right)$$

In this $y_g$-based example, this can be interpreted as refining the bounding box's geometry based on a weighted average of the output of primary model 232 as originally trained and the output of primary model 232 at the current stage of retraining. In some implementations, Σ=σI where σ is a scalar value and I is an identity matrix.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to:

U.S. Provisional Application No. 62/804,615; and
U.S. Patent Publication No. US20180150728A1.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for training a machine learning system over an input space, the input space comprising at least one of: images and video, based on a training dataset comprising items in a source domain and associated ground-truth labels and a test dataset comprising items in a target domain, the method executed by at least one processor in communication with at least one memory and comprising:
    training a primary model, wherein the primary model comprises an object-detection model in the at least one memory based on at least a first item of the training dataset and an associated first label;
    instantiating an ancillary model in the at least one memory, the ancillary model operable to classify objects in the input space with an associated confidence based on one or more parameters of the ancillary model; and
    retraining the one or more parameters of the primary model based on the test dataset, wherein retraining the one or more parameters of the primary model comprises retraining the one or more parameters of the primary model based on a training item from the training dataset, a ground-truth label associated with the training item, and a test item from the test dataset, said retraining comprising:
        generating a prediction based on at least a second item of the test dataset by the primary model, wherein generating a prediction based on at least the second item comprises generating, for at least the second item, a bounding box and an associated object classification;
        generating an ancillary confidence associated with the prediction by the ancillary model, wherein generating the ancillary confidence associated with the prediction comprises:
            extracting from the bounding box an extracted item comprising at least one of: an image and a video; and
            classifying the extracted item by the ancillary model;
        determining a value of an objective function based on the prediction and the ancillary confidence, wherein determining the value of the objective function comprises:
            determining a first value of the objective function based on the test item, the bounding box of prediction of the primary model, and the ancillary confidence of the ancillary model;
            determining a second value of a second objective function based on the training item and the associated ground-truth label; and
            determining the value of the objective function based on the first value of the objective function and the second value of the second objective function; and
        updating at least one of the one or more parameters of the primary model based on the value of the objective function.

2. The method of claim 1 wherein the prediction comprises a predicted confidence and wherein determining the value of the objective function comprises determining a first value based on the predicted confidence, determining the second value based on the ancillary confidence, and determining the value of the objective function comprises determining the value of the objective function based on the first and second values.

3. The method of claim 2 wherein determining the value of the objective function comprises scaling the second value relative to the first value by a scaling factor.

4. The method of claim 3 wherein determining the value of the objective function comprises annealing the scaling factor from an initial value at a first stage of retraining to a later value at a second stage of retraining after the first stage of retraining.

5. The method of claim 3 wherein scaling the second value relative to the first value comprises determining a geometric mean of the first and second values parametrized by the scaling factor.

6. A computing system comprising:
    at least one processor;
    at least one nontransitory processor-readable medium communicatively coupled to the at least one processor, the at least one nontransitory processor-readable medium which stores at least one of processor-executable instructions or data which, when executed by the at least one processor, cause the at least one processor to:
    train a primary model, wherein the primary model comprises an object-detection model, based on at least a first item of a training dataset and an associated first label;
    instantiate an ancillary model, the ancillary model operable to classify objects in an input space with an associated confidence based on one or more parameters of the ancillary model, the input space comprising at least one of: images and video; and retrain the one or more parameters of the primary model based on a test dataset, the test dataset comprising items in a target domain, wherein to retrain the one or more parameters of the primary model the at least one processor retrains the one or more parameters of the primary model based on a training item from the training dataset, a ground-truth label associated with the training item, and a test item from the test dataset, and wherein to retrain the one or more parameters, the at least one processor:
- generates a prediction based on at least a second item of the test dataset by the primary model, wherein to generate a prediction based on at least the second item the at least one processor generates, for at least the second item, a bounding box and an associated object classification;
- generates an ancillary confidence associated with the prediction by the ancillary model, wherein to generate the ancillary confidence associated with the prediction the at least one processor:
  - extracts from the bounding box an extracted item comprising at least one of: an image and a video; and
  - classifies the extracted item by the ancillary model;
- determines a value of an objective function based on the prediction and the ancillary confidence, wherein to determine the value of the objective function the at least one processor:
  - determines a first value of the objective function based on the test item, the bounding box of the prediction of the primary model, and the ancillary confidence of the ancillary model;
  - determines a second value of a second objective function based on the training item and the associated ground-truth label;
  - determines the value of the objective function based on the first value of the objective function and the second value of the second objective function; and
- updates at least one of the one or more parameters of the primary model based on the value of the objective function.

7. The system of claim 6 wherein the prediction comprises a predicted confidence and wherein to determine the value of the objective function the at least one processor determines a first value based on the predicted confidence, determining the second value based on the ancillary confidence, and determines the value of the objective function comprises determining the value of the objective function based on the first and second values.

8. The system of claim 7 wherein to determine the value of the objective function the at least one processor scales the second value relative to the first value by a scaling factor.

9. The system of claim 8 wherein to determine the value of the objective function the at least one processor anneals the scaling factor from an initial value at a first stage of retraining to a later value at a second stage of retraining after the first stage of retraining.

10. The system of claim 8 wherein to scale the second value relative to the first value the at least one processor determines a geometric mean of the first and second values parametrized by the scaling factor.

* * * * *